United States Patent
Fellowes et al.

(10) Patent No.: US 12,436,648 B2
(45) Date of Patent: Oct. 7, 2025

(54) COMPUTER-GENERATED IMMERSIVE AND INTERACTIVE DISPLAYS BASED ON TRANSFORMED DIMENSIONAL VIEWS

(71) Applicant: FELLOWES, INC., Itasca, IL (US)

(72) Inventors: John Fellowes, Wheaton, IL (US); Todd Holderness, Itasca, IL (US); Jami Bruno, Itasca, IL (US); Tai Hoon K. Matlin, Round Lake Beach, IL (US)

(73) Assignee: FELLOWES, INC., Itasca, IL (US)

( * ) Notice: Subject to any disclaimer, the term of this patent is extended or adjusted under 35 U.S.C. 154(b) by 0 days.

(21) Appl. No.: 18/740,429

(22) Filed: Jun. 11, 2024

(65) Prior Publication Data
US 2024/0411411 A1 Dec. 12, 2024

Related U.S. Application Data

(60) Provisional application No. 63/472,572, filed on Jun. 12, 2023.

(51) Int. Cl.
| | |
|---|---|
| *G06F 3/044* | (2006.01) |
| *G06F 3/0488* | (2022.01) |
| *G06F 30/13* | (2020.01) |
| *G06K 19/07* | (2006.01) |

(52) U.S. Cl.
CPC ............ *G06F 3/044* (2013.01); *G06F 3/0488* (2013.01); *G06F 30/13* (2020.01); *G06K 19/0723* (2013.01)

(58) Field of Classification Search
CPC ........ G06F 3/044; G06F 3/0488; G06F 30/13; G06K 19/0723
See application file for complete search history.

(56) References Cited

U.S. PATENT DOCUMENTS

| | | | |
|---|---|---|---|
| 9,852,388 B1 * | 12/2017 | Swieter | G06Q 10/06313 |
| 9,898,695 B2 | 2/2018 | Suwald | |
| 9,955,318 B1 * | 4/2018 | Scheper | G06Q 10/02 |

(Continued)

OTHER PUBLICATIONS

Do Brands Need High Tech Showrooms? INPHANTRY, https://www.inphantry.com/do-brands-need-high-tech-showrooms/ (Aug. 29, 2016).

(Continued)

*Primary Examiner* — Michael Pervan
(74) *Attorney, Agent, or Firm* — Pillsbury Winthrop Shaw Pittman, LLP

(57) ABSTRACT

Systems and methods are described for generating an immersive experience for designing a physical space using multi-dimensional visualizations and sharing the design process in real-time. A system may system may identify a user and access a project associated with the user. The system may identify an input token placed on a touchscreen of an interaction device and a stored object associated with the input token. The system may access information about and a visual representation of the stored object. The system may generate, for display via the touchscreen, a two-dimensional view of the physical space and/or the information about the stored object. The system may generate a three-dimensional view of the physical space that includes the visual representation of the stored object. The system may transmit the three-dimensional view for display via one or more display devices that are independently housed from the interaction device.

21 Claims, 10 Drawing Sheets

(56) References Cited

U.S. PATENT DOCUMENTS

| | | | |
|---|---|---|---|
| 9,983,684 B2* | 5/2018 | Wang | G06F 3/0304 |
| 10,088,938 B2 | 10/2018 | Perrin et al. | |
| 10,614,625 B1 | 4/2020 | Goetzinger et al. | |
| 2007/0062852 A1* | 3/2007 | Zachut | A63F 3/00643 |
| | | | 209/683 |
| 2008/0158165 A1* | 7/2008 | Geaghan | G06F 3/03545 |
| | | | 345/173 |
| 2011/0169779 A1* | 7/2011 | Boer | G06V 40/1318 |
| | | | 345/175 |
| 2012/0155349 A1* | 6/2012 | Bajic | H04L 69/329 |
| | | | 370/310 |
| 2012/0276977 A1* | 11/2012 | Leczek | G07F 17/3211 |
| | | | 463/22 |
| 2015/0309705 A1* | 10/2015 | Keeler | G06N 20/00 |
| | | | 705/27.2 |
| 2015/0356774 A1* | 12/2015 | Gal | G06F 30/00 |
| | | | 345/633 |
| 2016/0140930 A1* | 5/2016 | Pusch | G06F 3/011 |
| | | | 345/633 |
| 2016/0180602 A1* | 6/2016 | Fuchs | A63F 13/26 |
| | | | 463/31 |
| 2016/0292925 A1* | 10/2016 | Montgomerie | H04L 65/75 |
| 2020/0209955 A1 | 7/2020 | Guerriero | |

OTHER PUBLICATIONS

Windows Into the Future, INPHANTRY, https://www.inphantry.com/case-study/marvin-7tide/, accessed on Sep. 11, 2024.

Showroom Experiential, https://www.showroomexp.com/work, accessed on Sep. 11, 2024.

International Search Report and Written Opinion issued in corresponding International Application No. PCT/US2024/033454, dated Oct. 2, 2024.

* cited by examiner

COMPUTER-GENERATED IMMERSIVE AND INTERACTIVE DISPLAYS BASED ON TRANSFORMED DIMENSIONAL VIEWS

CROSS-REFERENCE TO RELATED APPLICATIONS

This application claims priority to U.S. Provisional Patent Application No. 63/472,572, filed on Jun. 12, 2023, which is incorporated by reference in its entirety herein.

BACKGROUND

There have been some advancements in the utilization of interactive touch screens with object recognition, typically they have been simple objects place upon the touch screen as to allow the processor receiving the signal to recognize the object, typically a controller allowing for it to be moved upon the touch screen and rotated to control actions upon that screen.

From the most basic, a drawing tablet which recognizes a capacitive pen interface, and or pressure of them pen such as the WACOM line of touch sensitive drawing monitors, to a more sophisticated system which combines a software program designed to recognize and interact with sensed patterns and pressures of touch and the touch screen itself.

These and other touch screen interactive systems show differing configurations of the touch screen, the interaction of the individual/s interacting with the touch screen and how the touch screen technology is utilized to recognize the object placed upon it and its effect upon the screen graphics when moved.

Furthermore, Virtual Reality (VR) goggles have been to create a realistic environment. However, there are known issues with the reluctance to use such a device due to the isolating nature of the device and the inability to interact with others outside the virtual environment projected within the goggles' screens. This creates a problem when multiple decision makers are involved in an interactive experience and need to express by hand actions, facial movements, and observable body posturing which is limiting when engaged with such obtrusive googled experiences.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
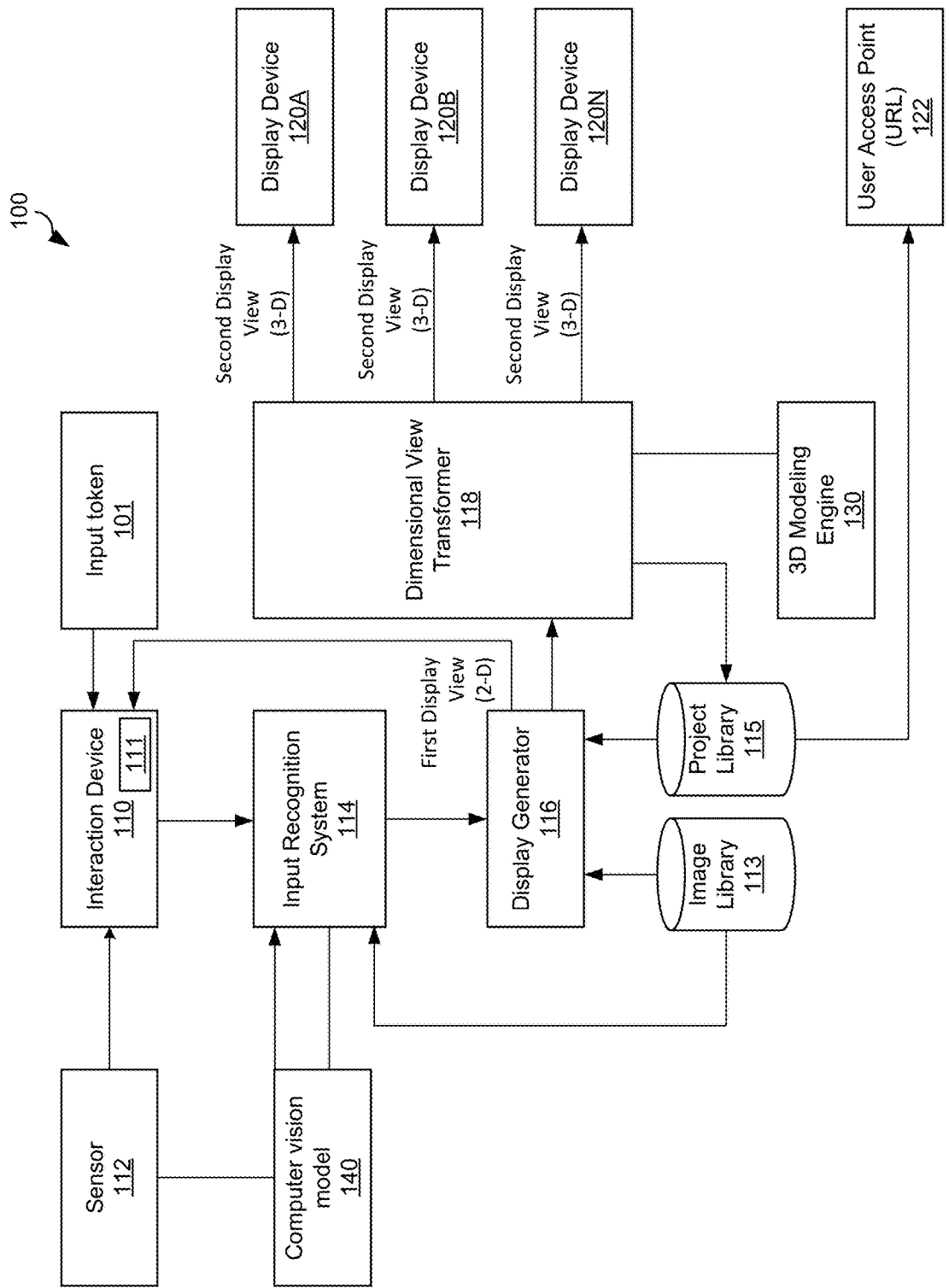
FIG. 1 illustrates an example of a system for generating immersive displays using transformed dimensional views from multiple inputs.

FIG. 1 illustrates an example of a system 100 for generating immersive displays using transformed dimensional views from multiple inputs. The system 100 may include an input token 101, an interaction device 110, a sensor 112, an input recognition system 114, a display generator 116, a dimensional view transformer 118, display devices 120 (illustrated as display devices 120A-N), and/or other features. The system 100 may store and retrieve data described herein using one or more datastores, such as an image library 113 and a project library 115.

The system 100 may be used to design, update and share a project that is rendered using the dimensional views and/or immersive displays. A project is a collection of objects designed by one or more users using one or more of the features of the system 100. For illustration, examples of projects will be described in the context of designing a physical space using floorplans, furnishings, finishes (such as wall or flooring options), and/or other options. In these examples, the input tokens 101 may represent particular furnishings, finishes, and/or other components that can furnish, decorate, or otherwise be added to a physical space. Users may design and update a project, which may represent an office space, a home, or other physical space. In some examples, a project being designed may be visualized in real-time using the immersive displays shared in real-time via a network to other users, such as via a user access point such as a Uniform Resource Locator (URL) to a website, desktop application, mobile application, or other user-accessible location. The URL or other user access point may be secured through obfuscation, authentication, and/or other security measures to restrict access to authorized users, such as co-workers or family members of the user designing the project. In some examples, the project may be saved and later viewed via download or through the access location. The term real-time as used herein means that as inputs are received, the project is updated immediately (pending any application, network or system delays and latencies) with corresponding changes to the visualization provided through the immersive displays and/or website URL.

The interaction device 110 is a device used to receive input for generating a first display view for presentation on a display 111 of the interaction device 110 and a second display view for presentation on one or more of the display devices 120A-N. The interaction device 110 may receive inputs via an input token 101, touch, gesture control, pressure control, object recognition, short range transmission, and/or other inputs.

The input token 101 is a physical object that is manipulated by a user to provide inputs to the interaction device 110. For example, the input token 101 may include a portion that is detectable by the interaction device 110, a QR code that is scanned by the interaction device 110, an Near-Field Communication (NFC) tag that is read by the interaction device 110, a Radio Frequency Identification (RFID) tag that is read by the interaction device 110, a BLUETOOTH transmitter that broadcasts identifying signals, and/or other input techniques. In some examples, the input token 101 may represent a specific type of object that is to be depicted in the first display view and/or the second display view. For example, a QR code, an NFC tag, and/or a BLUETOOTH signal may encode an object identifier. The object identifier may be stored in the image library 113 in association with an image to be depicted in the first display view and/or the second display view.

In some examples, only a single identifier is decoded from the input token 101. In these examples, the input token 101 will be referred to as encoding a single identifier. In some examples, multiple identifiers can be decoded from the input token 101. In these examples, the input token 101 will be referred to as variably encoding multiple identifiers. For example, an identifier may be decoded from the input token 101 based on a physical characteristic such as a shape of the input token 101. Put another way, in some examples, the input token 101 may encode multiple identifiers based on its physical characteristics. In some of these examples, the input token 101 may be manipulated by a user to change a physical characteristic of the input token 101. For example, the user can manipulate the input token 101 to change its shape or other physical characteristic. When a first physical characteristic of the input token 101 is recognized, a first identifier may be decoded or recognized. Similarly, when a second physical characteristic of the input token 101 is recognized, a second identifier may be decoded or recognized. In a particular example, an input token 101 may represent a flooring option, such as a specific wood floor that is depicted in the visualization. Manipulating the shape or other characteristic of the input token 101 will result in different floor colors being updated in the visualization. In this way, users may use the input token 101 to add a corresponding type of flooring to the project and then manipulate the input token 101 to change the color of the flooring. Further examples and details of an input token 101 that is manipulatable are further described with respect to FIGS. 8A and 8B.

The input token 101 may be a generic token or a project-specific token. A generic input token 101 is a token that identifies an object across different projects. A project-specific input token 101 is one that is specifically associated with a project. In this example, the input token 101 has a unique identifier such as encoded by a unique RFID chip that is stored in the project library 115. In some examples, when the project is identified and associated to a specific client project, the designs may be made available specifically to users associated with the client project. For example, these users may logon to a secure URL or other user access point that includes data associated with client sessions that includes updated designs and cloud data images as they occur. In this way, offsite team members may be able to participate in the design session live as it occurs and/or for review at a later date.

In some embodiments, an input token 101 is a user input token 101 that is assigned to a user or project. In these embodiments, a user identifier or project identifier is recognized when the input token 101 is recognized. For example, a user may place a user input token 101 on the multi-touch surface of the display 111 to start a new project or retrieve and update an existing project.

The sensor 112 is a device that is able to measure or otherwise generate sensor data about an object. For example, the sensor 112 may be a camera, an accelerometer, a gyroscope, a Light Detection and Ranging (LIDAR) sensor, a Radio Detection and Ranging (RADAR) sensor, and/or other type of sensor. When the sensor 112 is configured as a camera, the sensor data from a camera device may be images such as photographs or video.

The input recognition system 114 is a computational system that recognizes the inputs described herein. The computational system may be implemented based on one or more components illustrated in FIG. 6. The input recognition system 114 may access the input from the interaction device 110 and/or the sensor 112 to identify inputs to the system. The inputs may therefore include a single input or a combination of inputs, which may be the same or different types of inputs such as a touch input and an object-recognized input. The input recognition system 114 may recognize, for example, gestures or pressure input on the display 111, gestures or motions detected based on sensor data from a sensor 112, images of the particular input token 101 being used (for example, when an appearance, or a marking, or generated signal on the input token is uniquely distinguishable from other input tokens), NFC, RF, or BLUETOOTH signals, and/or other input or combination of inputs.

Figure 8A:
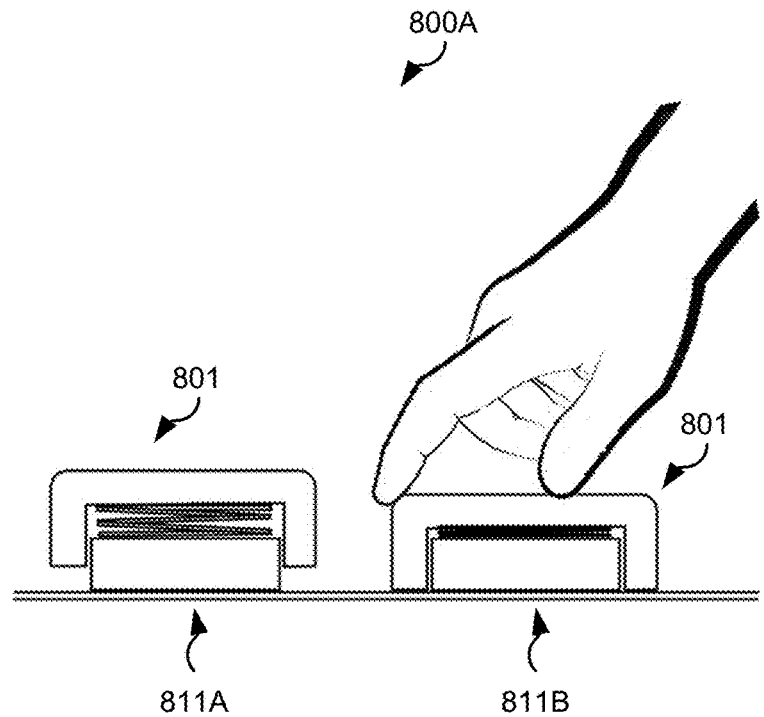
FIG. 8A illustrates an actuatable input token for which multiple inputs are recognized depending on an actuation state of the actuatable input token.
Figure 8B:
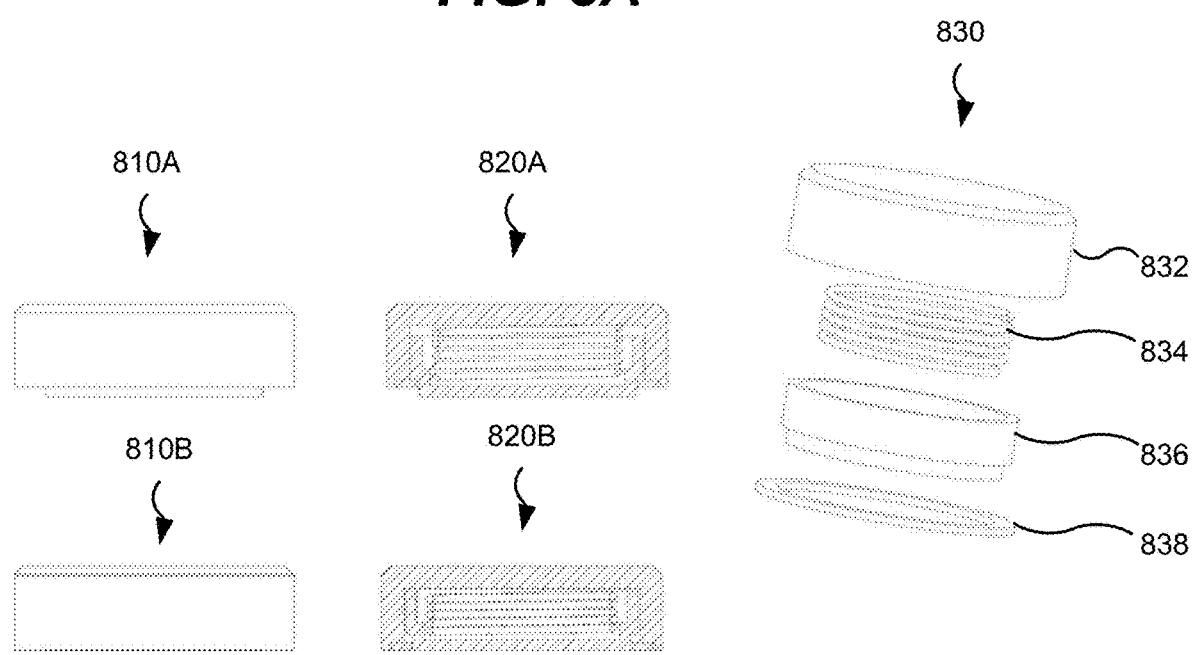
FIG. 8B illustrates side elevational views, side cross-sectional views, and an exploded view of the actuatable input token.

In some embodiments, the input recognition system 114 may use a computer vision model 140 to recognize objects such as an input token 101 (and actuatable embodiments of input tokens illustrated in FIGS. 8A and 8B). The computer vision model 140 is a model that is trained to process, understand, and identify objects in electronic visual data such as images and videos. Examples of computer vision models include GPT-4V, LaVA (Large Language and Vision Assistant), and BakLLaVA.

The display generator 116 is a computational system that generates the first display view based on the recognized the inputs. The computational system may be implemented based on one or more components illustrated in FIG. 6. The display generator 116 may receive the inputs from the interaction device 110 and/or the sensor 112 and generate a first display view for presentation on the display 111 of the interaction device 110.

To illustrate use of the system 100, an example of interactively designing a two-dimensional floorplan and/or elements in the floorplan to depict a three-dimensional view of the floorplan will be described for illustration. However, other types of immersive interactions may be used such as in the field of video games, virtual manufacturing, training systems, and/or other implementations of the system 100.

In the context of designing a floorplan (depicted in the first display view) or elements thereof, the display generator 116 may access a floorplan that is being designed from the project library 115. The floorplan may be a blank space with no walls or delineated spaces, partially designed with some walls or spaces, and/or fully designed with existing walls and spaces. Each region of the floorplan may correspond to a position on the display 111 so that an input location on the display 111 will correspond to a location on the floorplan. The display generator 116 may use the recognized inputs to modify the floorplan, such as by moving or creating walls, defining spaces, or otherwise creating the floorplan. For example, touch inputs on the display 111 may be translated into creating walls, removing walls, and/or modifying other features of the floorplan.

The display generator 116 may use other types of inputs to fill in the design of the floorplan. For example, a user may manipulate an input token 101 that identifies a particular type of flooring to use. The display generator 116 may access, from the image library 113, an image of the flooring identified by an item identifier encoded in the input token 101 and place image of the flooring at a location where the input token 101 was placed on the display 111 or at other designated location of the floorplan. In this way, the user may touch, for example, the input token 101 at a location in the floorplan to "design" that location of the floorplan with the corresponding flooring selection. Other ways to input the flooring or other selection may be used as well or instead. Other aspects of the floorplan may be similarly designed using other input tokens 101 and/or other inputs. As the floorplan is designed, the display generator 116 may modify the image of the floorplan for display at the display 111 in real-time.

The dimensional view transformer 118 is a computational system that transforms the first display view into a second display view. The computational system may be implemented based on one or more components illustrated in FIG. 6. In some examples, the first display view is a two-dimensional image and the second display view is a three-dimensional image transformed from the two-dimensional image. In another example, the first display view is a three-dimensional image and the second display view is a two-dimensional image transformed from the three-dimensional image. Transforming from a two-dimensional image such as a floorplan to a three-dimensional image such as a virtual (three-dimensional) representation of the space designed using the floorplan may be accomplished through 3-dimensional modeling techniques.

2-D to 3-D Transformation

The floorplan may be an image file such as a Computer-Aided Design (CAD) file, a vector file, a Joint Photographic Experts Group (JPEG) file, a Portable Network Graphic (PNG) file, and/or other type of image. The dimensional view transformer 118 may access a dimension scale of the floorplan, such as room dimensions (length, width, height) of depicted walls or floors of the floorplan. The dimensional view transformer 118 may model the two-dimensional (2D) floorplan based on the image and the dimension scale using a three-dimensional (3D) modeling engine 130. Examples of 3D modeling engines 130 may include, without limitation, UNREAL ENGINE or other game engines, AUTOCAD, REVIT, BLENDER, and SKETCHUP.

3D modeling may include creating a base layer and then identifying walls, rooms, and other floorplan elements. The walls and partitions may be extruded vertically to represent their height based on the dimension scale. Floors and ceilings may be added based on the extruded walls. Furnishings and décor identified during the design phase (such as using input tokens 101 and/or other inputs) may be included based on 3D images of these items stored in the image library 113.

In some examples, textures, colors, and materials may be mapped to 3D objects. For example, textures may be assigned to surfaces of the floorplan. In some examples, lighting and rendering may be rendered to virtually in 3D illuminate the designed floorplan. The lighting parameters may be configurably altered and/or predefined based on the selected lighting object. For example, the image library 113 may include parameters such as lighting intensity, color, hue, and/or other lighting characteristics. Likewise, selected windows or other floorplan elements may have associated characteristics that may be rendered.

To create a 2D floorplan from a 3D model (such as when the first display view is a 3D view and the second display view is a 2D view transformed from the 3D view), the dimensional view transformer 118 may use orthographic projection. Orthographic projection is a process that involves projecting 3D elements onto a two-dimensional plane to create a simplified floorplan representation.

The dimensional view transformer 118 may transmit the second display view for presentation on a display device 120, which is separate from the display 111. In this manner, using both the display 111 and the display device 120, both a two-dimensional (such as top-down perspective) and a three-dimensional (such as three-dimensional perspective) view of the designed floorplan may be displayed.

The various display views generated by the display generator 116 and/or the dimensional view transformer 118 may be stored as part of a project in the project library 115. Access to the visualizations may be provided in real-time during a design session and/or later retrieved after the design session through a user access point 122, such as via a URL.

The display device 120 is a device that displays the second display view and/or other images. For example, the display device 120 may include a projector device and projection surface such as a projection screen, a television, and/or other type of display device. Generally, but not necessarily, the display device 120 is a large-format display. For example, the display device 120 has a diagonal screen size that may be larger than the diagonal screen size of the display 111. In particular, in some examples, the display device 120 may have a diagonal screen size that is greater than 65 inches, greater than 75 inches, greater than 85 inches, greater than 100 inches, greater than 120 inches, or greater than 135 inches.

In some examples, the dimensional view transformer 118 may split the second display view into portions for presentation on respective display devices 120. For example, if two display devices 120 are used, the dimensional view transformer 118 may split the second display view into two halves (or other two portions), one for each of the two display devices 120. This may facilitate, for example, presentation of two walls at right angles if the two display devices 120 are physically arranged at right angles. Other uses for immersive experiences may be used as well.

Figure 2:
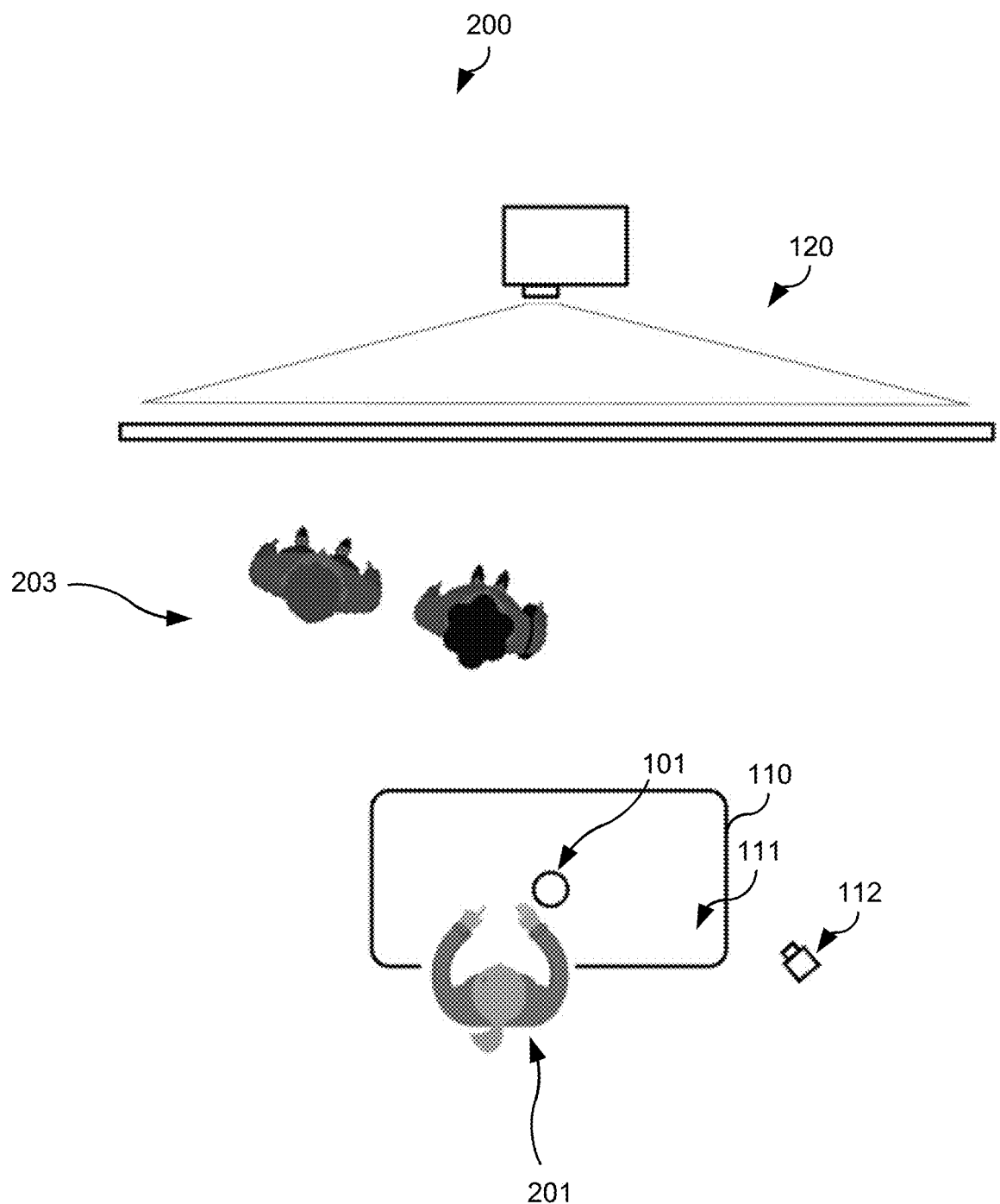
FIG. 2 illustrates a plan view of an embodiment of the system illustrated in FIG. 1 in which the primary output being the primary experiential space in proximity to the interactive controller surface.

FIG. 2 illustrates a plan view of an embodiment of the system illustrated in FIG. 1 in which the primary output being the primary experiential space in proximity to the interactive controller surface. As illustrated, a user 201 modifies a first display view of a 2D floorplan via the interaction device 110 and display 111. The interaction device 110 receives user inputs via the user 202 directly interacting with the display 111, the user 102 manipulating an input token 101, and/or the sensor 112 detecting other inputs. As the user 102 provides inputs to the interaction device 110, the first display view (such as a 2D floorplan) is modified and displayed at the display 111 of the interaction device 110. Additionally, the first display view is transformed into a second display view (such as a 3D model that renders the 2D floorplan in three dimensions) that is displayed via the display device 120, which is experienced in an immersive way by other users 203.

Figure 3:
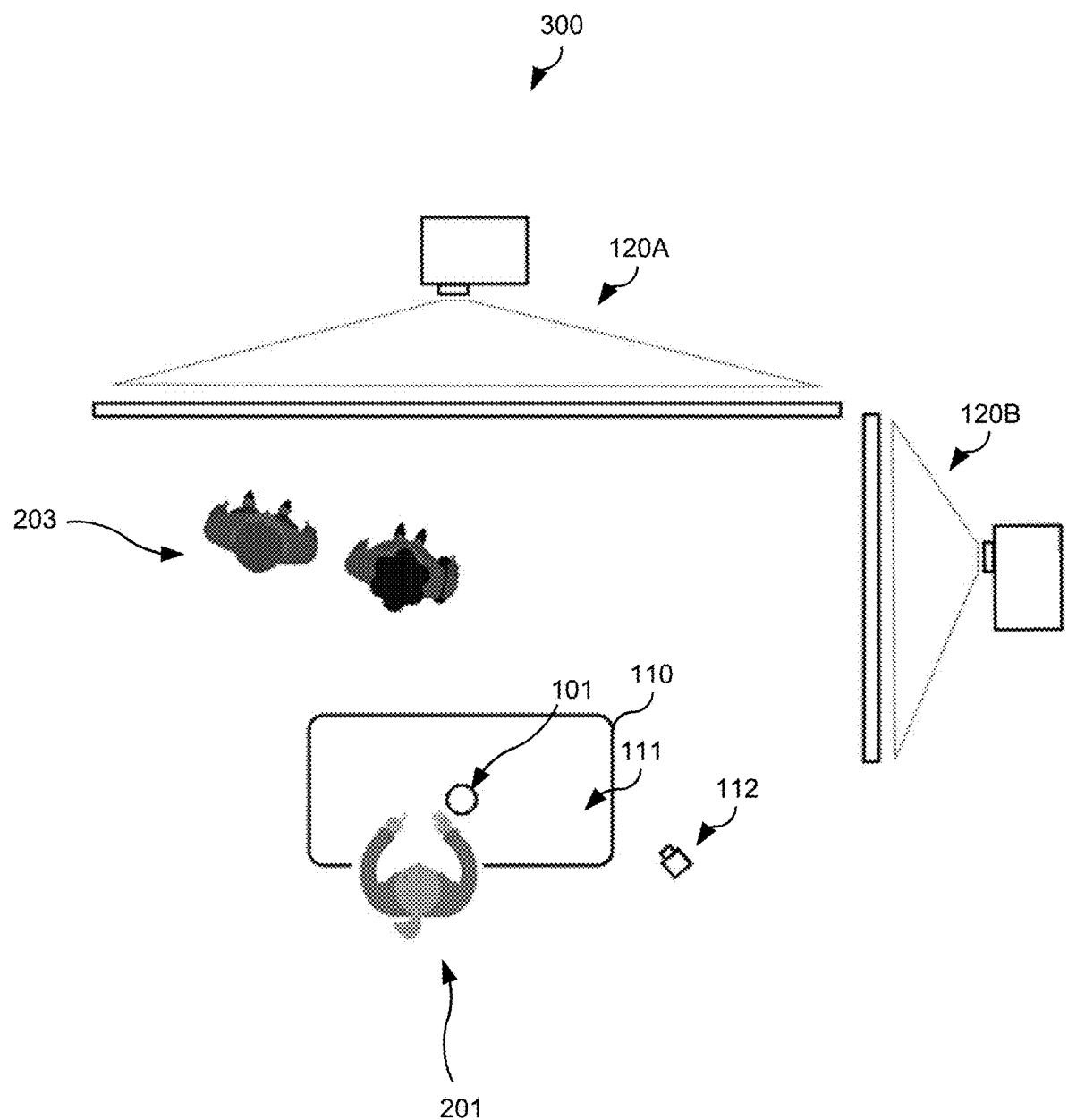
FIG. 3 illustrates a plan view of an embodiment of the system illustrated in FIG. 1 in which the primary output being a plurality of structures to create a defined primary experiential space.
Figure 4:
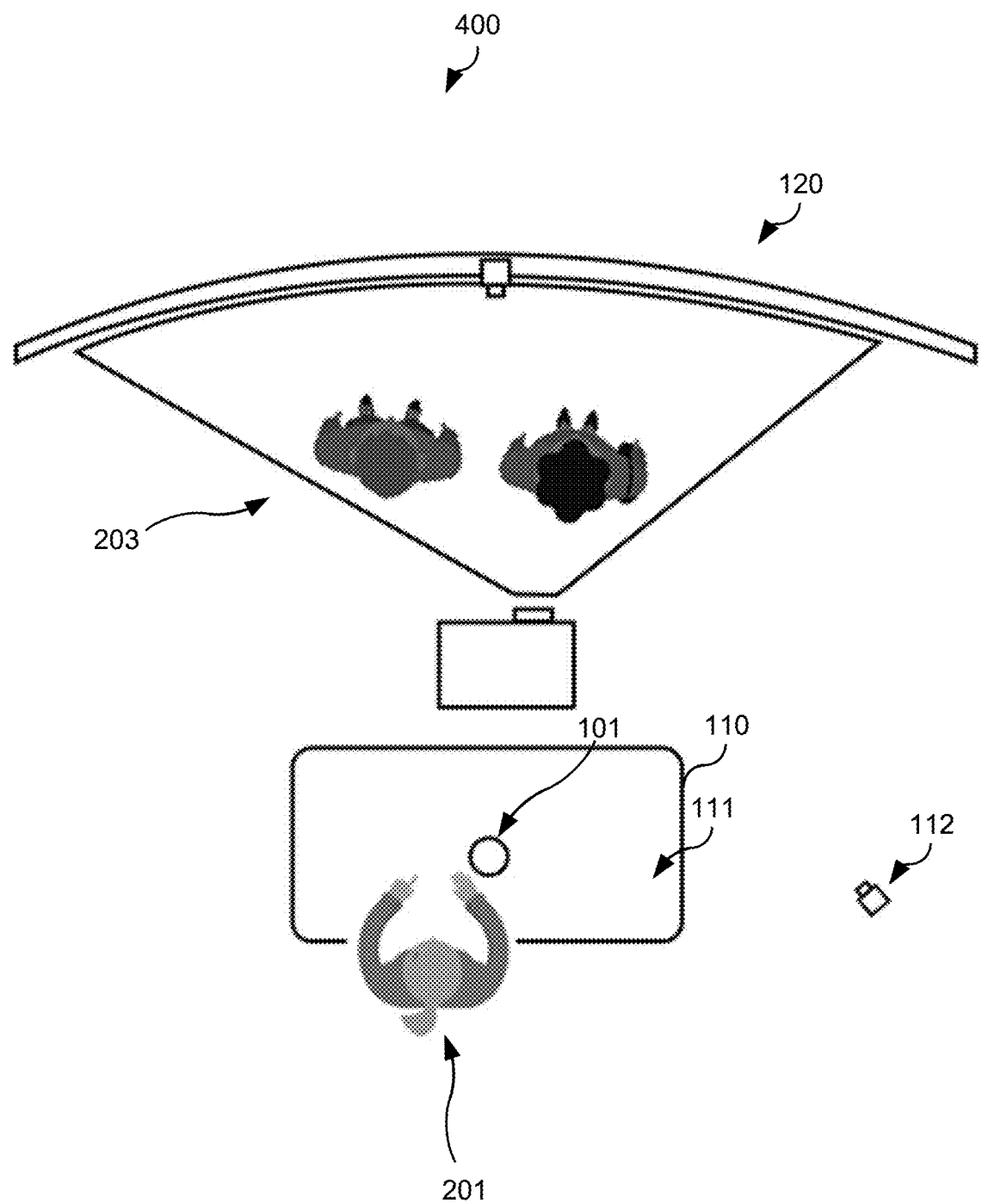
FIG. 4 is a plan view of an embodiment of the system illustrated in FIG. 1 in which the primary output is a curved surface to create the primary defined experiential space.

FIG. 3 illustrates a plan view of an embodiment of the system illustrated in FIG. 1 in which the primary output being a plurality of structures (multiple display devices 120) to create a defined primary experiential space. FIG. 4 is a plan view of an embodiment of the system illustrated in FIG.

1 in which the primary output (display device 120) is a curved surface to create the primary defined experiential space.

Figure 5:
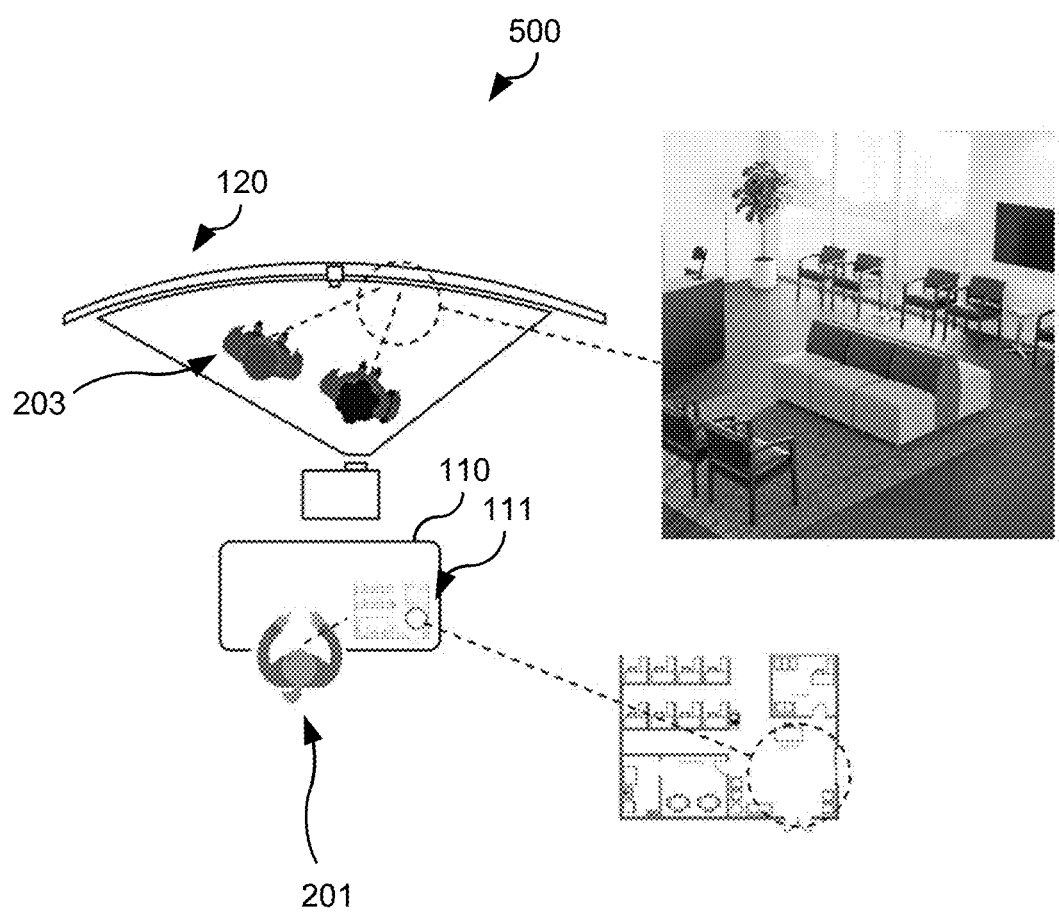
FIG. 5 is a plan view of the interactive control surface showing an office layout top view, while the image on the primary experiential space is a 3D perspective view.

FIG. 5 is a plan view 500 of the interactive control surface showing an office layout top view (the first display view), while the image on the primary experiential space is a 3D perspective view (the second display view).

Systems and methods disclosed herein overcome one or more limitations of the current immersive experiences offered by today's technology. The systems and methods disclosed herein facilitates an immersive design experience without users having to be isolated and therefore induces interactive cooperation and free expression during the cooperative design experience and allows for the important co-creative experiences and events to take place in real time in a much more effective manner than was previously possible.

The basic element, an interactive touch screen device is used as a simple input device. This device is optionally further enhanced by the utilization of object recognition software. This software in the simplest means deciphers the recognized touch pattern and or shape in contact with the screen's surface and matches it with an assigned graphical representation. Typically the graphical representation is an geometric shape or groups of shapes which then can be manipulated by moving/re-orienting the object in contact with the screen's surface (as the object moves or is rotated, new touch points are sensed and the signal is then communicated to the processor which then outputs the corresponding graphical output back onto the touch screen). These types of objects which are place upon the touch screen have a surface pattern (in some cases utilizing capacitive materials) which allows the touch sensors to input the pattern constantly sensed to the controller which then outputs the corresponding associated output back to the input screen as to give the correspondingly programed feedback image desired.

Another way to utilize a surface whether touch, movement, or graphical object recognition capability (shape or pattern vs. a unique capacitance signature) is by the use of a camera, shape identification software and the output onto a control surface through the use of a screen, projection (back projection and or direct to surface projection), glass surface and or any surface desired which can be used as a graphical interface of which a control means (input recognition) is obtainable.

With the aforementioned interactive control input, the disclosed systems and methods method in which a floor layout of a particular space can be represented onto an interactive control surface; the layout can then be manipulated and moved by the use of direct contact onto the surface (touch means) and or by a recognizable capacitive pattern (object such as a puck—with a shape or pattern upon the contact point placed upon the touch sensors surface) or a recognizable graphics pattern such as a QR code place onto the control surface as to be seen by the visual sensor (such as a camera). The movement of the object or token and or by touch would therefore change the shape, size and placement and orientation of elements which make up the floor plan.

As the floor plan is developed, a means beyond the graphical representation back to the flat control surface is needed for the full interactive experience and for the designers and clients to fully interact with the space to make the desirously proper and important design decisions quickly and easily. This is accomplished by having a designated experiential space in proximity to the interactive control surface. The experiential space has one or more surfaces creating a space in which a large enough image can be represented (by projection or other means). The objective is to feel like you are experiencing the event of observing the object/s, room/s, and views at full scale, so it would be desirous to ensure the allocated space can show the representative object/s and portions of the interior space in as much scale representation as possible. As the control surface has the graphical representation, changes in positioning (viewing direction) and proximity would then be additionally represented in real time, upon the defined experiential space in the proper 3D perspective view (even when the control surface shows the orientation in 2D). With this in mind, by moving through the floor plan and even when changing the floor plan, the corresponding perspective image would be seen and experienced within that space in real time. That way doorway placement, ceiling heights, room sizes, windows, electrical connections, etc. could be established, designed and refined by manipulating the graphical representation on the control surface (by the aforementioned means) and additionally shown in scale and in perspective within the experiential space.

Additionally, within the floor plan, interior elements such as flooring, wall surfaces, coverings, graphics such as art, plants etc. can be added to the floor plan by touching and moving icons or by the use of represented icons in the form of graphical patterns, or puck like moveable objects upon the control surface is then represented in real time in real scale and in perspective upon the defined experiential space's defining surfaces. In another embodiment of the device, the experiential space can be used as an additional or primary input area by the use of gesture sensing cameras and or the interpretation of touching certain surfaces within the experiential space.

Other advantages such as specialized products (even branded products) can be represented by designated graphical icons selected from drop down or pop-up menus, website catalogues, and or objects which can be positioned directly onto the interactive control surface, be positioned and repositioned and during those changes, the experiential space would allow the participating members see and feel like they are right there within that environment live as they make important decisions and changes. This not only enhances the ability to cooperatively participate in an unprecedented way in the designing and evaluation process. This is accomplished by way of the unique unencumbered, natural process the invention allows for and encourages the stake holders to push and create new possibilities and alternatives easily and quickly. The participants can by way of QR codes, or unique identifiers (even their business card/s) bring up their unique design projects to review and revise effortlessly, quickly, and constantly in their efforts to bring to life their ultimate spaces and designs.

As the space gets further refined, designers and customers can then choose and try out an assortment of finishes, textures, lighting, work surfaces, virtually anything, and everything associated with designing the optimal work environment prior to the expense of construction and finishing. The disclosed invention facilitates the designing thereof while instantaneously experiencing those spaces and the products within that space in real time allowing the participants to make design decisions in an as it happens interactive environment unencumbered by the need to use restrictive devices such as VR headsets, handsets, and other encumbering devices.

One non-limiting aspect of the system is the ability to input floor space data and output build record data for an entire multi-work space office (i.e., a collection of individual work spaces, including, for example, fully or partially walled/enclosed offices, open work spaces such as cubicle areas/bays, and shared work space, such as conference/meeting rooms). The input data may be derived from a floor plan, which can be input as an image file or another format used in design planning software. With an image file, the system may be configured to recognize identical or substantially similar workspaces from within the image file and create a category for each one with the correlated information, particularly the size in terms of length, width, height, and knowledge of window and door locations. In particular, the length, width, height, windows, door locations, and/or parts of a floorplan may be stored as features to train an image classifier for image classification and recognition.

Image recognition, also known as image classification or computer vision, is the process of identifying and categorizing objects or patterns within digital images. It involves using computer algorithms and machine learning techniques to analyze the visual content of an image and make predictions or classifications based on that analysis.

The process of image recognition typically involves the following steps: Data Collection: A dataset of labeled images is collected, where each image is associated with one or more predefined categories or classes. These images serve as training data for the image recognition model. Preprocessing: The collected images may undergo preprocessing steps to enhance their quality and normalize their features. This can include resizing, cropping, adjusting colors, or applying filters to improve the image's clarity and consistency. Feature Extraction: In this step, relevant features are extracted from the images. Features can include edges, textures, colors, or higher-level representations learned by deep neural networks. Various techniques like convolutional neural networks (CNNs) or feature detectors (such as SIFT, SURF, or HOG) can be employed to extract meaningful features.

Model Training: The extracted features and the corresponding labels are used to train a machine learning model, such as a CNN, a support vector machine (SVM), or a deep neural network. During training, the model learns to recognize patterns and features associated with each class by adjusting its internal parameters.

Model Evaluation: The trained model is evaluated using a separate dataset, called a validation set or test set, which was not used during training. The evaluation measures the model's accuracy, precision, recall, and other performance metrics to assess its effectiveness in recognizing and classifying images.

Once the model is trained and evaluated, it can be used for image recognition on new, unseen images. The model analyzes the visual features of the image and makes predictions about the objects or categories present in the image. With software more tailored to architectural/construction usage, that information may be provided as formatted data or data elements to identify the category of each workspace. Based on the floor plan, the system can identify the different types of work spaces that need to be designed, which design elements can include selection of furniture, walls, trim, functional components like monitor arms, trays, shelves, drawers, etc. for each type of workspace.

For example, the system 100 may recognize three executive offices (larger, such as 10 feet by 15 feet), 10 mid-level offices (such as 10 feet by 10 feet), two conference rooms, and 16 cubicle bays in a floor plan. This is an example and not limiting. The system 100 can then be used to design the desired functional and aesthetic elements for each type of work space. Each work space type can be designed individually, and data for the choices made can be stored. Upon completion (or even midway during the office space design process), build record information can be output. Each design may be stored as build record information in the project library 115. The build record information may include the components selected, their trim style, and the other information needed to create a list of materials needed to build the entire office space. The build record information may also include price information so an estimate or quote can be provided in real time. Likewise the build record information may include lead time information so the purchaser/designer understands when certain components or styles thereof will be available. The price and lead time data may be stored in a server or other database and retrieved in real time as pricing and lead time information changes.

Figure 6:
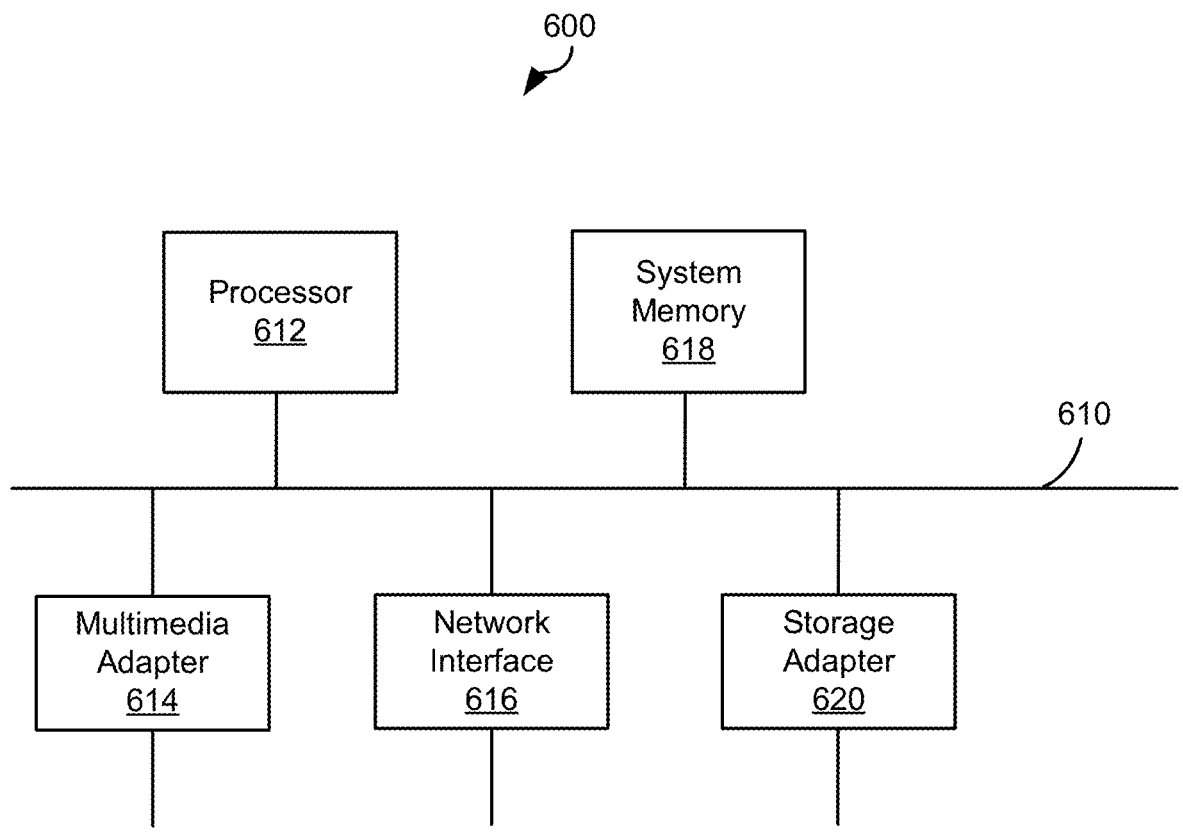
FIG. 6 illustrates an example of a computer system that may be implemented by features illustrated in FIG. 1.

FIG. 6 illustrates an example of a computer system 600 that may be implemented by features illustrated in FIG. 1. The interconnect 610 may interconnect various subsystems, elements, and/or components of the computer system 600. As shown, the interconnect 610 may be an abstraction that may represent any one or more separate physical buses, point-to-point connections, or both, connected by appropriate bridges, adapters, or controllers. In some examples, the interconnect 610 may include a system bus, a peripheral component interconnect (PCI) bus or PCI-Express bus, a HyperTransport or industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 610 may allow data communication between the processor 612 and system memory 618, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 612 may control operations of the computer system 600. In some examples, the processor 612 may do so by executing instructions such as software or firmware stored in system memory 618 or other data via the storage adapter 620. In some examples, the processor 612 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 614 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 616 may provide the computer system 600 with an ability to communicate with a variety of remote devices over a network. The network interface 616 may include, for example, an Ethernet adapter, a Fibre Channel adapter, and/or other wired- or wireless-enabled adapter. The network interface 616 may provide a direct or indirect connection from one network element to another and facilitate communication and between various network elements. The storage adapter 620 may connect to a standard computer readable medium for storage and/or retrieval of information, such as a fixed disk drive (internal or external).

The term "scanning" a filesystem or similar terms such as a filesystem scan may refer to the act of scanning all or a portion of the filesystem. A portion may refer to one or more distinct files, one or more directories, one or more partitions, and/or other subset of the filesystem 160. The term "module" as used herein may refer to instructions that program hardware and/or hardware that is specifically programmed to perform the functions described with respect to that module.

Other devices, components, elements, or subsystems (not illustrated) may be connected in a similar manner to the interconnect 610 or via a network. The devices and subsystems can be interconnected in different ways from that shown in FIG. 6. Instructions to implement various examples and implementations described herein may be stored in computer-readable storage media such as one or more of system memory 618 or other storage. Instructions to implement the present disclosure may also be received via one or more interfaces and stored in memory. The operating system provided on computer system 600 may be MS-DOS®, MS-WINDOWS®, OS/2®, OS X®, IOS®, ANDROID®, UNIX®, Linux®, or another operating system.

Figure 7:
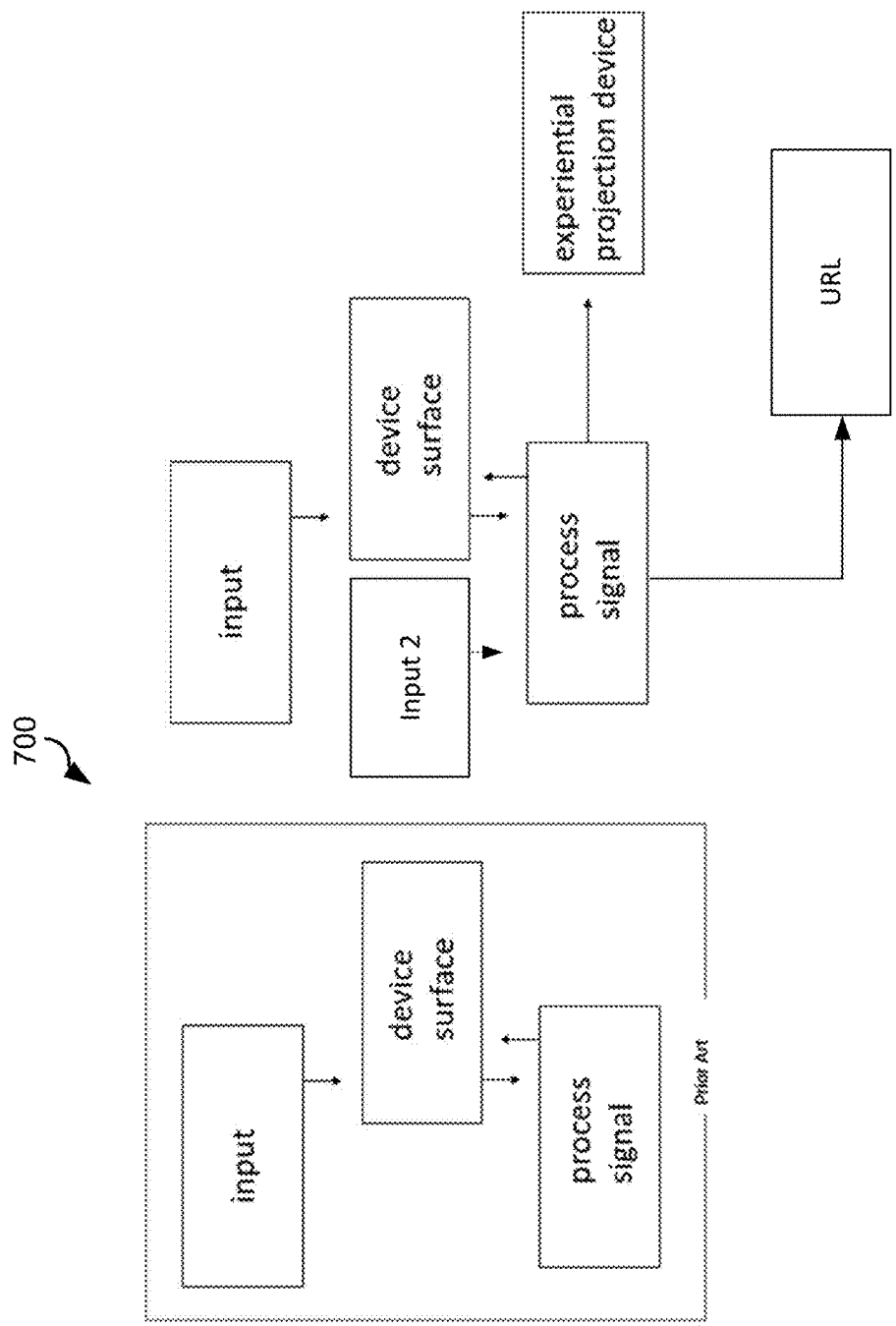
FIG. 7 is a side-by-side comparison of a prior art system and the system of the present patent application.

FIG. 7 is a side-by-side comparison 700 of a prior art system and the system of the present patent application. FIG. 7 contrasts the prior approach to a system of the present application. In the prior art, the input into the device is returned back to the same device to update the subject matter displayed thereon. This is typical of user interaction focused on a single user or if the input device is of the larger type such as those oriented as tables, the experience is limited to the plurality of users having direct access to the input output device's surface. With the new system of the present application, the experiential device like a projection screen allows a large number of participants and users to see a larger scale image of the workspace being design, and can see it as a group, and can participate as a group deciding on the inputs into the device such as those generated by the tokens and the submenu choices due to the enlarged experiential projection—thus enabling real time feedback from the people participating in the designing of and the viewing of the simulated workspace, which can be used to update the workspace immediately using the user interface on the controller device surface.

In one embodiment of the present patent application, the display can also be remote. The system allows people on TEAMS, WEBEX, etc., see the same content as what is displayed on the big screen in the room. In some embodiments, a unique client related URL, the same content is displayed live, while files are being updated for immediate and later access by those given permission to access the secure URL. In some embodiments, inputs other than the multi-touch surface inputs to display 111 may be used to recognize identifiers for use as inputs to the system. These inputs allow for a multi-faceted approach to improve the object recognition accuracy to the point of the system allowing for most any object to be place onto or within the allowable vicinity of the input surface and the system, when actuated to accept the object as a token, and to be associated to the corresponding digital image which can be then manipulated, altered, optionally projected, shared and or stored, as previously disclosed. This improved object recognition system would also facilitate the use of AI tools as a means to create, update and improve the object and or token recognition (utilizing AI assisted object recognition) as well as the improvement of the output variables and concepts variables (utilizing AI assisted rendering) as to improve the collaborative creative experience overall.

In some embodiments, the input token 101 illustrated in FIG. 1 is an actuatable token for which system responses are altered based on an actuation state of the input token 101. For example, FIGS. 8A and 8B illustrate different views 800A and 800B of an actuatable input token 801. To further improve interactivity and robustness of the system, the actuatable input token 801 may include actuations. The actuations may include mechanical actuations such as through a push button, rotation action, and/or otherwise mechanically adjusting the body or other portion of the actuatable input token 801. For example, referring to FIG. 8A, mechanical actuation of the actuatable input token 801 is illustrated as a push-button actuation in which a body of the actuatable input token 801 is depressed in a button-like manner from a first actuation state 811A (shown as an unpressed state) to a second actuation state 811B (shown as a pressed state).

FIG. 8B shows side elevational views 810A and 810B, side cross-sectional views 820A and 820B, and an exploded view 830 of the actuatable input token 801. The side elevational view 810A and side cross-sectional view 820A correspond to the first actuation (unpressed) state 811A illustrated in FIG. 8A. The side elevational view 810B and side cross-sectional view 820B correspond to the second actuation (pressed) state 811A illustrated in FIG. 8A. Referring to the exploded view 830, the actuatable input token 801 may include an outer body 832, a compliant portion 834, a middle portion 836, and a bottom portion 838. The compliant portion 834 is disposed inside the middle portion 836 between the outer body 832 and the bottom portion 838. In this way, the outer body 832 may be depressed downward toward the bottom portion 838 when assembled together. The compliant portion 834 is illustrated as a spring in which the tension, number of coils, and/other characteristics may vary according to particular needs. It should be noted that other types of components may be used in addition to or instead of a spring, such as a membrane switch, piezoelectric sensors, capacitive sensors, magnetic sensors, and/or other types of sensors or devices that can detect or otherwise facilitate depression.

Although not expressly illustrated in FIGS. 8A and 8B, other actuation states may exist in between 811A to 811B depending on the level of depression. Furthermore, other types of actuation states may be used depending on the type of actuation used. For example, instead of or in addition to a pressable actuation, the actuatable input token 801 may be actuated by a rotating actuation in which a portion of the actuatable input token 801 is rotated about another portion. In this example, different actuation states may result from the twisting actuation.

In some embodiments, the system 100 may detect the actuation state of the actuatable input token 801 and vary the response to the detected actuation state accordingly. For example, the input recognition system 114 may detect a first actuation state of the actuatable input token 801 and the display generator 116 may alter the various display views responsive to the first actuation state. Likewise, the input recognition system 114 may detect a second actuation state of the actuatable input token 801 and the display generator 116 may alter the various display views responsive to the second actuation state. These responses may vary depending on the type of the actuatable input token 801. For example, the system 100 may change the flooring color of a project if an actuatable input token 801 represents flooring. In this example, a user may place the actuatable input token 801 on or in proximity to the interaction device 110, the input recognition system 114 may recognize the actuatable input token 801, and may render a default flooring color on a display view. As the user manipulates the actuatable input token 801 between different actuation states, the input recognition system 114 recognizes the different actuation states and changes the flooring color that corresponds to each actuation state. Alternatively or additionally, different actuation states may each correspond to different system actions. For example, one actuation state may cause the display generator 116 to display a menu while another actuation state may cause a selection of a menu item.

The input recognition system 114 may recognize the actuation states in various ways depending on the configuration of the actuatable input token 801. For example, in some embodiments in which the actuatable input token 801 is detected through capacitance on the multi-touch surface of the display 111, physical actuation may alter the capacitance value of the actuatable input token 801. Different levels of pressing in this example will result in corresponding levels of capacitance, which is detected by the multi-touch surface of the display 111. For example, when fully depressed, an outer body (832 in FIG. 8B) of the actuatable input token 801 may contact a touchscreen or other capacitive surface and when not fully depressed, there is a distance between the outer portion and the capacitive surface, resulting in variable capacitance.

In embodiments in which the actuatable input token 801 includes an RFID tag, physical actuation may alter the signature of the RFID antenna in deterministic ways. In this example, the sensor 112 may include an RFID reader. A first actuation state may alter the shape of the RFID antenna and therefore its resonance, causing the RFID tag to emit a first signal to the RFID reader. Likewise, a second actuation state may alter the shape of the RFID antenna and therefore its resonance, causing the RFID tag to emit a second signal to the RFID reader. Other actuation states may similarly alter the resonance of the RFID antenna in a deterministic and therefore detectable way.

In some embodiments, mechanical actuation may modify the token identifier. For example, if the token identifier is a capacitive multi-touch of the display 111 that identifies the size, shape and or pattern or a value change of the capacitive signal, a change in that signal can be interpreted by the input recognition system 114, as an additional "touch" within the token's identified footprint then signaling an actuation has taken place. In systems which utilize a block pattern as the token recognition system, the pattern can be altered in a predictive way as to capture the actuation, such as an additional block of a given color or shape is lowered out of the base of the token and is within the optical sensor's detection. When the optical change is observed within the predictive and allowed pattern change, the change can be identified as a token actuation vs. the token itself being taken off or moved and replaced with another token which would be signaled by a change of the entire optical pattern vs a predicted portion thereof. By using minor changes to an optical pattern such as a block pattern, the mechanical actuation of the token body is recognized and the input signal is then processed by the input recognition system 114 and the correspondingly pre-programed sequences are then initiated.

In some embodiments, input recognition system 114 may recognize the actuation states based on an array for sensor 112 residing in proximity to the multi-touch surface of the display 111, the input recognition system 114 may recognize the identity, shape and/or position of the actuatable input token 801. For example, in some embodiments, the input recognition system 114 may use the computer vision model 140 to recognize various actuatable input tokens 801 and their actuation states. In particular, the computer vision model 140 may be trained with a corpus of images, which may be stored in the image library 113, that include, for each actuatable input token 801: an image of the actuatable input token 801, an image for each of its various actuation states, and/or other images relating to the actuatable input token 801.

The actuatable input token 801 may be marked, categorized or identified by the surface inputs from interaction device 110, when placed upon the multi-touch surface of the display 111. The input recognition system 114 may recognize changes in actuation states based on detected and recognized changes to the token's profile shape such as a portion of the token's outer surface being moved up and down (such as a figurine's body parts being moved if the actuatable input token 801 is a figurine), being rotated, or actuated in other ways. The actuation of the actuatable input token 801, when identified would then be considered an additional or supplemental input actuation. When the input actuation is identified, the input recognition system 114 would then output the corresponding designated response (such as bringing up a specific designated menu or submenu on the multi-touch surface of the display 111, or allow the token to now behave in a different manner when rotated or moved on the multi-touch surface).

Figure 9:
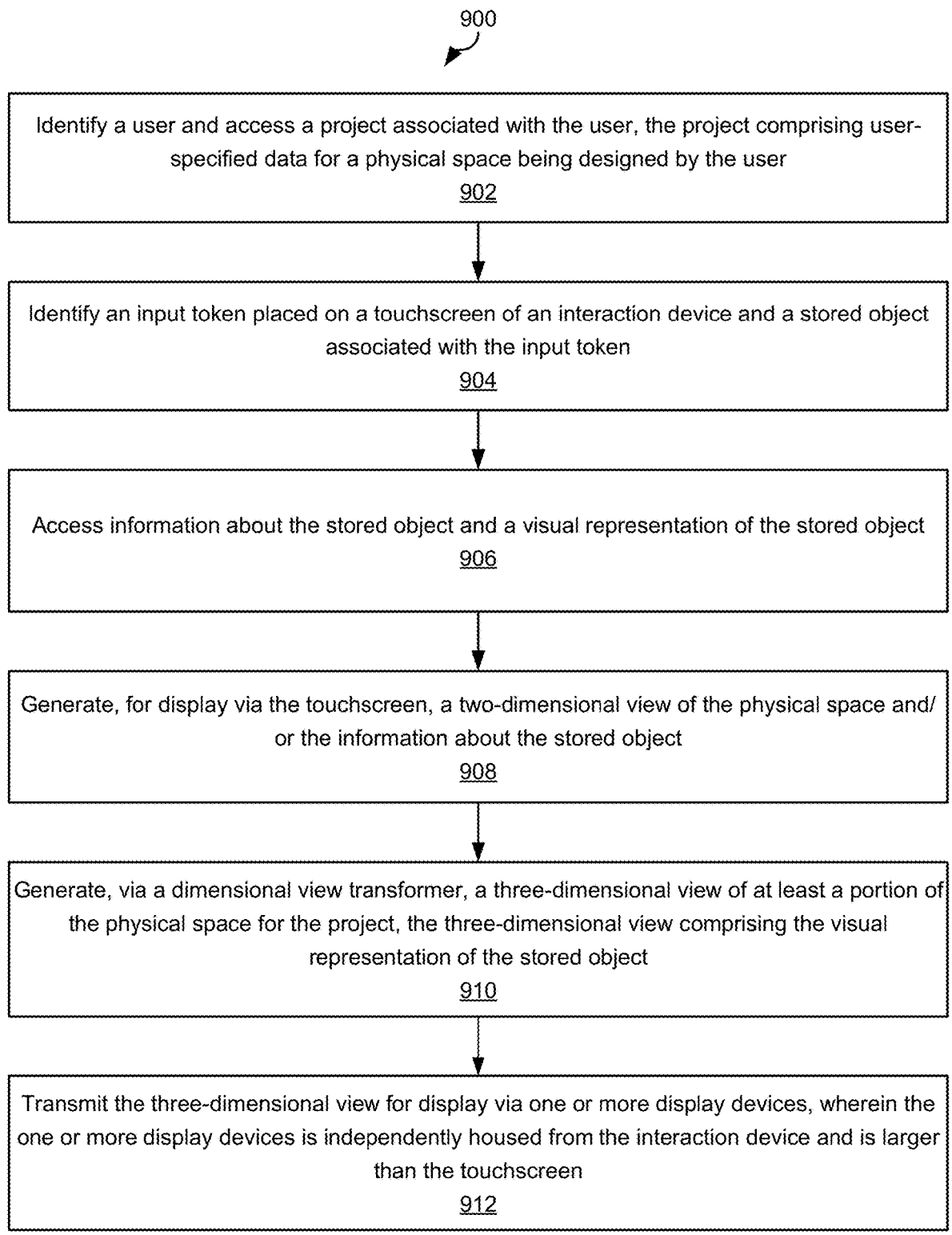
FIG. 9 illustrates an example of a method for generating immersive displays using transformed dimensional views from multiple inputs.

FIG. 9 illustrates an example of a method 900 for generating immersive displays using transformed dimensional views from multiple inputs. At 902, the method 900 may include identifying a user and accessing a project associated with the user, the project comprising user-specified data for a physical space being designed by the user. The physical space may be defined by a floorplan, which may be modified by the user. At 904, the method 900 may include identifying an input token (such as an input token 101, which may include an actuatable input token 801 (placed on a touchscreen of an interaction device (such as an interaction device 110) and a stored object (such as an object stored in the image library 113 or the project library 115) associated with the input token. At 906, the method 900 may include accessing information about the stored object and a visual representation of the stored object. The information may include a description, dimension, color, and/or other aspect of a physical object represented by the stored object. At 908, the method 900 may include generating, for display via the touchscreen, a two-dimensional view of the physical space and/or the information about the stored object. At 910, the method 900 may include generating, via a dimensional view transformer, a three-dimensional view of at least a portion of the floorplan for the project, the three-dimensional view comprising the visual representation of the stored object. At 912, the method 900 may include transmitting the three-dimensional view for display via one or more display devices (such as a display device 120), wherein the one or more display devices is independently housed from the interaction device and is larger than the touchscreen.

Figure 10:
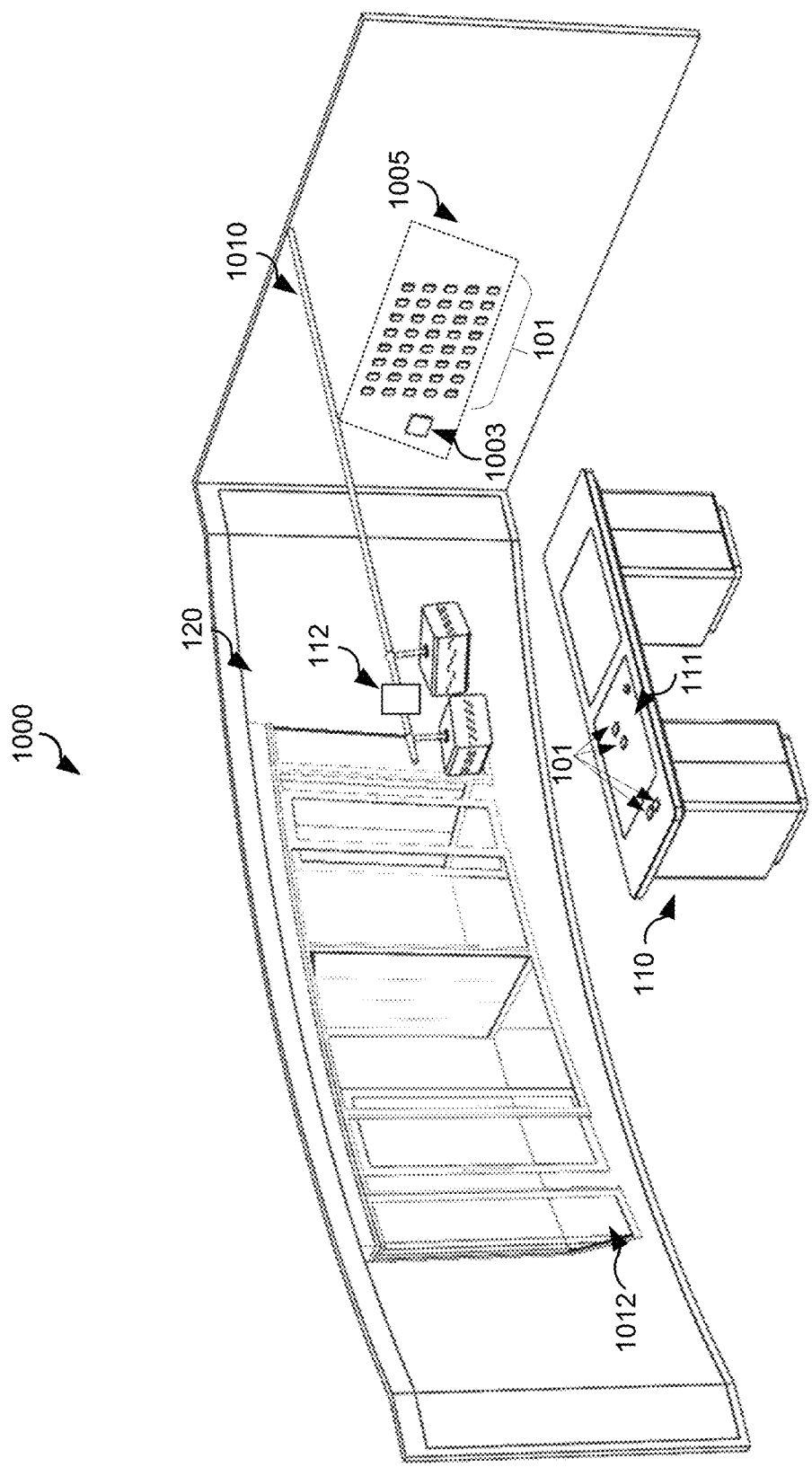
FIG. 10 illustrates a perspective view of an embodiment of the system illustrated in FIG. 1 in which an experiential space is created for designing a project.

FIG. 10 illustrates a perspective view 1000 of an embodiment of the system 100 illustrated in FIG. 1 in which an experiential space is created for designing a project. Various components of system 100 are omitted from FIG. 10 for clarity. As illustrated, the interaction device 110 may be implemented as a table on which the display 111 is placed. One or more input tokens 101 may be placed on the display 111 for detection and/or on a table surface off the display 111. One or more sensors 112 may be mounted on a mounting structure 1010 (such as a pole). The mounting structure 1010 may also be used to mount projectors that project three-dimensional views onto a display device 120 (in these examples, the projector and projected surface can be considered part of the display device 120. The sensors 112 may detect and/or identify one or more input tokens 101 and/or actuation state of input tokens 101 that are actuatable. The experiential space may include an area 1005 that includes a control panel 1003 and a plurality of input tokens 101 that may be selected by a user and placed on the display 111. The control panel 1003 may control settings of the experiential space such as lighting, ambient temperature, audio, power for the various equipment in the experiential space, and/or other control settings.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "120A-N" does not refer to a particular number of instances of 120A-N, but rather "two or more."

The databases or datastores described herein (such as 113, 115) may be, include, or interface to, for example, an SQLite database, an Oracle™ relational database sold commercially by Oracle Corporation. Other databases, such as Informix™, DB2 or other data storage, including file-based (such as spreadsheet or extensible markup language documents), or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independently and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a processor programmed to:
   identify a user and access a project associated with the user, the project comprising user-specified data for a physical space being designed by the user;
   identify an input token placed on a touchscreen of an interaction device and a stored object associated with the input token;
   access information about the stored object and a visual representation of the stored object;
   generate, for display via the touchscreen, a two-dimensional view of the physical space and/or the information about the stored object;
   generate, via a dimensional view transformer, a three-dimensional view of at least a portion of the physical space for the project, the three-dimensional view comprising the visual representation of the stored object;
   transmit the three-dimensional view for display via one or more display devices, wherein the one or more display devices is independently housed from the interaction device and is larger than the touchscreen; and
   transmit, via a user access point, for display to one or more authorized users in real-time as the project is being updated or for later download by the one or more authorized users, data relating to the project and/or the three-dimensional view.

2. The system of claim 1, wherein the input token is an actuatable input token having a plurality of actuation states, each actuation state being associated with a corresponding system response or visual representation of the stored object.

3. The system of claim 2, wherein the processor is further programmed to:
   determine a first capacitance on the touchscreen that is imparted by the actuatable input token based on a first actuation state; and
   generate a first visualization change in the three-dimensional view based on the first capacitance.

4. The system of claim 3, wherein the processor is further programmed to:
   determine a second capacitance on the touchscreen that is imparted by the actuatable input token based on a second actuation state;
   generate a second visualization change in the three-dimensional view based on the second capacitance; and
   change the three-dimensional view from the first visualization change to the second visualization change in response to the second capacitance.

5. The system of claim 2, wherein the processor is further programmed to:
   identify the actuatable input token and/or an actuation state based on a computer vision model trained on one or more images of the actuatable input token and/or the plurality of actuation states.

6. The system of claim 1, wherein the input token comprises a Radio Frequency Identification (RFID) tag, and wherein the processor is programmed to identify the input token based on the RFID tag.

7. The system of claim 6, wherein the input token is an actuatable input token having a plurality of actuation states and wherein a resonance of the RFID tag is varied based on an actuation state of the actuatable input token.

8. The system of claim 1, wherein the processor is further programmed to;
 identify a direction, size, or pattern of movement of the input token on the touchscreen of the interaction device; and
 identify a system response or a visualization change to the stored object based on the identified direction, size, or pattern of movement.

9. The system of claim 1, wherein to identify the user, the processor is programmed to: detect a user input token placed on the touchscreen.

10. A method, comprising:
 identifying, by a processor, a user and accessing a project associated with the user, the project comprising user-specified data for a physical space being designed by the user;
 identifying, by the processor, an input token placed on a touchscreen of an interaction device and a stored object associated with the input token;
 identifying, by the processor, a direction, size, or pattern of movement of the input token on the touchscreen of the interaction device;
 identifying, by the processor, a system response or a visualization change to the stored object based on the identified direction, size, or pattern of movement;
 accessing, by the processor, information about the stored object and a visual representation of the stored object;
 generating, by the processor, for display via the touchscreen, a two-dimensional view of the physical space and/or the information about the stored object;
 generating, by the processor, via a dimensional view transformer, a three-dimensional view of at least a portion of the physical space for the project, the three-dimensional view comprising the visual representation of the stored object; and
 transmitting, by the processor, the three-dimensional view for display via one or more display devices, wherein the one or more display devices is independently housed from the interaction device and is larger than the touchscreen.

11. The method of claim 10, wherein the input token is an actuatable input token having a plurality of actuation states, each actuation state being associated with a corresponding system response or visual representation of the stored object.

12. The method of claim 11, further comprising:
 determining a first capacitance on the touchscreen that is imparted by the actuatable input token based on a first actuation state; and
 generating a first visualization change in the three-dimensional view based on the first capacitance.

13. The method of claim 12, further comprising:
 determining a second capacitance on the touchscreen that is imparted by the actuatable input token based on a second actuation state;
 generating a second visualization change in the three-dimensional view based on the second capacitance; and
 changing the three-dimensional view from the first visualization change to the second visualization change in response to the second capacitance.

14. The method of claim 11, further comprising:
 identifying the actuatable input token and/or an actuation state based on a computer vision model trained on one or more images of the actuatable input token and/or the plurality of actuation states.

15. The method of claim 11, wherein the input token comprises a Radio Frequency Identification (RFID) tag, the method further comprising:
 identifying the input token based on the RFID tag.

16. The method of claim 15, wherein the input token is an actuatable input token having a plurality of actuation states and wherein a resonance of the RFID tag is varied based on an actuation state of the actuatable input token.

17. The method of claim 10, wherein the processor is further programmed to:
 transmitting, via a user access point, for display to one or more authorized users in real-time as the project is being updated or for later download by the one or more authorized users, data relating to the project and/or the three-dimensional view.

18. A non-transitory computer readable medium storing instructions that, when executed by a processor, program the processor to:
 detect a user input token placed on a touchscreen;
 identify a user based on the user input token and access a project associated with the user, the project comprising user-specified data for a physical space being designed by the user;
 identify an input token placed on the touchscreen of an interaction device and a stored object associated with the input token;
 access information about the stored object and a visual representation of the stored object;
 generate, for display via the touchscreen, a two-dimensional view of the physical space and/or the information about the stored object;
 generate, via a dimensional view transformer, a three-dimensional view of at least a portion of the physical space for the project, the three-dimensional view comprising the visual representation of the stored object; and
 transmit the three-dimensional view for display via one or more display devices, wherein the one or more display devices is independently housed from the interaction device and is larger than the touchscreen.

19. A system comprising:
 a processor programmed to:
 identify a user and access a project associated with the user, the project comprising user-specified data for a physical space being designed by the user;
 identify an input token placed on a touchscreen of an interaction device and a stored object associated with the input token;
 wherein the input token comprises a Radio Frequency Identification (RFID) tag, the processor is programmed to identify the input token based on the RFID tag, and wherein the input token is an actuatable input token having a plurality of actuation states, and a resonance of the RFID tag is varied based on an actuation state of the actuatable input token;
 access information about the stored object and a visual representation of the stored object;
 generate, for display via the touchscreen, a two-dimensional view of the physical space and/or the information about the stored object;
 generate, via a dimensional view transformer, a three-dimensional view of at least a portion of the physical space for the project, the three-dimensional view comprising the visual representation of the stored object; and
 transmit the three-dimensional view for display via one or more display devices, wherein the one or more display devices is independently housed from the interaction device and is larger than the touchscreen.

20. A system, comprising:
a processor programmed to:
- identify a user and access a project associated with the user, the project comprising user-specified data for a physical space being designed by the user;
- identify an input token placed on a touchscreen of an interaction device and a stored object associated with the input token;
- access information about the stored object and a visual representation of the stored object;
- generate, for display via the touchscreen, a two-dimensional view of the physical space and/or the information about the stored object;
- generate, via a dimensional view transformer, a three-dimensional view of at least a portion of the physical space for the project, the three-dimensional view comprising the visual representation of the stored object;
- transmit the three-dimensional view for display via one or more display devices, wherein the one or more display devices is independently housed from the interaction device and is larger than the touchscreen;
- identify a direction, size, or pattern of movement of the input token on the touchscreen of the interaction device; and
- identify a system response or a visualization change to the stored object based on the identified direction, size, or pattern of movement.

21. A system, comprising:
a processor programmed to:
- detect a user input token placed on a touchscreen;
- identify a user based on the user input token and access a project associated with the user, the project comprising user-specified data for a physical space being designed by the user;
- identify an input token placed on the touchscreen of an interaction device and a stored object associated with the input token;
- access information about the stored object and a visual representation of the stored object;
- generate, for display via the touchscreen, a two-dimensional view of the physical space and/or the information about the stored object;
- generate, via a dimensional view transformer, a three-dimensional view of at least a portion of the physical space for the project, the three-dimensional view comprising the visual representation of the stored object; and
- transmit the three-dimensional view for display via one or more display devices, wherein the one or more display devices is independently housed from the interaction device and is larger than the touchscreen.

* * * * *